United States Patent [19]

Pearl et al.

[11] Patent Number: 4,675,497

[45] Date of Patent: Jun. 23, 1987

[54] LASER CUTTING SYSTEM

[75] Inventors: David R. Pearl; Jacob Weiselfish, both of West Hartford, Conn.

[73] Assignee: Gerber Garment Technology, Tolland, Conn.

[21] Appl. No.: 812,117

[22] Filed: Dec. 23, 1985

[51] Int. Cl.$^4$ .............................................. B23K 26/00
[52] U.S. Cl. ........................... 219/121 LG; 198/621; 219/121 LU; 219/121 LY; 219/121 FS
[58] Field of Search .... 219/121 L, 121 LM, 121 LG, 219/121 LN, 121 LU, 121 LY, 121 FS; 198/463.3, 621

[56] References Cited

U.S. PATENT DOCUMENTS

| | | | |
|---|---|---|---|
| 3,195,710 | 7/1965 | Robinson | 198/463.3 X |
| 3,757,620 | 9/1973 | Cloud | 83/88 |
| 3,799,017 | 3/1974 | Halligan | 83/167 |
| 3,844,461 | 10/1974 | Robinson et al. | 226/8 |
| 4,018,674 | 4/1977 | Morris | 209/73 |
| 4,349,097 | 9/1982 | Curti | 198/463.3 X |
| 4,493,234 | 1/1985 | Ziegler | 83/175 |
| 4,540,087 | 9/1985 | Mizumoto | 198/621 |
| 4,544,824 | 10/1985 | Knutsson | 219/121 LG |

*Primary Examiner*—C. L. Albritton
*Attorney, Agent, or Firm*—McCormick, Paulding & Huber

[57] ABSTRACT

A laser cutting system comprises a means for controllably delivering sheet material to a laser cutter and automatically removing cut pieces of sheet material and scrap. The sheet material is supported on an inclined bed having longitudinal slots and the means for delivering sheet material comprises an engagement mechanism which engages an end of the sheet material while supported on the bed by frictionally or penetrably engaging the sheet material and a movement means for moving the engagement mechanism and the associated sheet material longitudinally of said slots. Vacuum means are provided to hold the sheet material on the inclined bed during cutting, which vacuum means are deactivated after cutting to allow the cut pieces and scrap to slide down the bed out of a cutting region to make room for a fresh worksheet. Various means are provided for facilitating the removal of the cut sheet material from the bed.

36 Claims, 12 Drawing Figures

LASER CUTTING SYSTEM

BACKGROUND OF THE INVENTION

The invention relates generally to laser cutting systems and deals more particularly with a means for delivering sheet material to a support surface where it is cut into pieces and for removing the cut pieces.

Laser cutting systems of the type with which this invention is concerned are capable of cutting sheet material accurately and rapidly. Such a system often includes a worksheet supporting surface, a laser cutter for cutting the sheet material, and a computer which controls the laser cutter. The support surface is designed to minimize back reflections of the laser beam of the laser cutter and to endure the laser beam itself. Laser cutting systems are often equipped to cut only one worksheet at a time and so, to increase the output of the system and to minimize the amount of human labor required to operate the system, it is important to provide a means for automatically delivering uncut sheet material to the support surface and for automatically removing the cut pieces. Also, it is important that the sheet material be delivered with few wrinkles.

A laser cutting system of the type with which this invention is concerned is disclosed in U.S. Pat. No. 3,755,861 to Castro et al. There, a worksheet supporting surface is formed from a plurality of honeycombed elements mounted on an endless conveyor belt. The honeycombs are open at the top and trap laser beams incident thereto to prevent harmful back reflections. A roll of sheet material to be cut is mounted to rotation above the bed and displaced longitudinally a few feet back from the receiving end of it. The sheet material is drawn from the roll downwardly into a slack loop by a soft wire roller which engages it beneath the roll. From the slack loop, the sheet material extends upwardly onto a highly polished, chute which guides it onto the endless conveyor. As the endless conveyor turns, the sheet material is drawn by friction from the slack loop, onto the worksheet supporting surface and downstream to a cutting location on the conveyor belt.

The honeycombed structure of the U.S. Pat. No. 3,755,861 belt is not disclosed in detail; however, a belt possibly of this type is shown in U.S. Pat. No. 3,828,697 to Egan. The U.S. Pat. No. 3,828,697 belt is rather complex and includes a plurality of slats assembled into an endless conveyor belt with the honeycombed elements being mounted on the slats.

A general aim of the invention is to provide a means for automatically feeding sheet material to a laser cutter reliably and without much wrinkling.

A more specific aim of the invention is to provide means for automatically feeding bites of limp sheet material and accurately tracking the sheet material as it is fed so that pattern pieces which overlap two or more bites may be cut accurately.

Another general aim of the invention is to provide such a feeding means which cooperates with a worksheet supporting bed having a more simple construction than that of a honeycombed bed.

Another general aim of the invention is to provide a means for automatically removing cut pattern pieces and scrap from a cutting region of the foregoing worksheet supporting bed to more fully automate the cutting process.

SUMMARY OF THE INVENTION

The invention resides in a means for transporting sheet material to a support bed for cutting by a laser cutter and removing cut pieces of the sheet material. According to one feature of the invention, the bed defines a plurality of elongated slots, and the means for transporting the sheet material to the bed comprises a mechanism which engages the sheet material located on the bed, which mechanism is subsequently moved longitudinally of the slots to transport the sheet material. According to a second feature of the invention, the means for transporting the sheet material slides the sheet material along the bed. According to a third feature of the invention, the support bed is inclined to allow the cut pieces of sheet material to slide downwardly out of a cutting region of the bed, and means are providing for holding the sheet material onto the bed during cutting. Means may also be provided to mechanically remove cut pieces of sheet material and scrap from the bed.

DETAILED DESCRIPTION OF THE INVENTION

Figure 1:
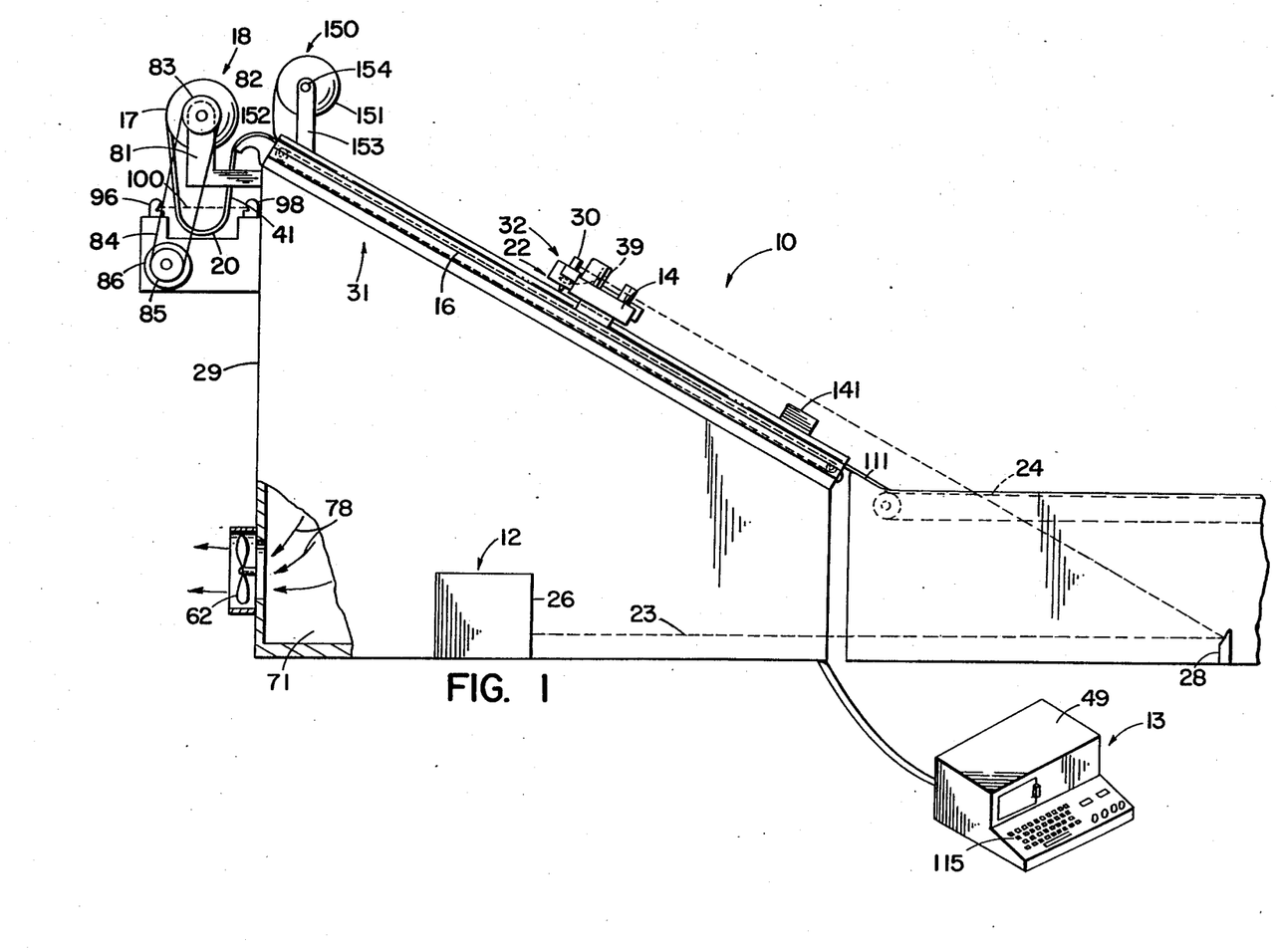
FIG. 1 is a side sectional view of a laser cutting system in which the invention is embodied and a worksheet.
Figure 2:
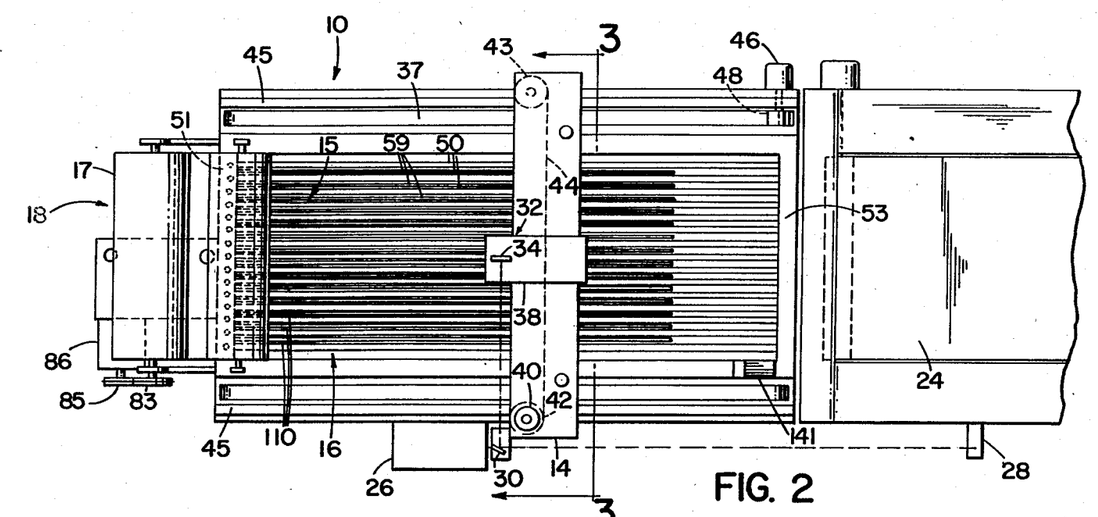
FIG. 2 is a top, plan view of the laser cutting system of FIG. 1 but does not show the worksheet on a bed of the system.

FIGS. 1 and 2 illustrate a laser cutting system generally designated 10 in which the invention is embodied. The system 10 includes a laser cutter 12, a table 31 including an inclined worksheet supporting bed 16, a storage mechanism 18 for rotatably supporting a roll of sheet material and unrolling it into a slack loop 20, a transport mechanism 22 for engaging sheet material so that it can be drawn from the slack loop onto the support bed 16, a drag bar assembly 15 to maintain tension in the sheet material as it is drawn onto the support bed, and an after conveyor belt 24 located at the base of the worksheet supporting bed for carrying away cut pattern pieces and scrap.

The laser cutter 12 comprises a source 26 of laser beams fixedly mounted to a frame 29 of the table 31, a mirror 28 fixedly mounted to the frame 29, another mirror 30 fixedly mounted to the gantry 14, and a laser cutting head 32 supported by the gantry 14 for movement in a plane parallel to and above the worksheet support bed 16. The laser cutting head 32 comprises another mirror 34 and a lens 39. As indicated by broken lines 23,23, laser beams are initially directed horizontally from the source 26 toward the mirror 28, then are reflected by the mirror 28 upwardly along an inclined path parallel to the support bed 16, then are reflected by the mirror 30 laterally across the bed 16 to the mirror 34 and finally are reflected by the mirror 34 and focused by the lens 39 downwardly onto a worksheet 41 located on the bed. By way of example, the laser beam is focused to a 0.002 inch diameter spot on the worksheet and the worksheet takes the form of a sheet of cloth.

The laser cutting head 32 is mounted to a carriage 38 and is movable in an illustrated y coordinate direction by means of a stepping motor 40, a timing pulley 42 directly driven by the motor 40, an idler pulley 43 and a timing belt 44 trained between the two pulleys, which belt is attached to the carriage 38. The laser cutting head 32 is also movable in an illustrated X-coordinate direction by a drive system including the gantry 14, guides 45,45 which support the gantry, a stepping drive motor 46, a timing pulley 48 directly driven by the motor 46, a pulley 47, and a timing belt 37 trained between the two pulleys 47 and 48, which belt is attached to one end of the gantry 14. Both stepping motors are controlled by a controller 13 which includes a computer 49. For a description of an apparatus capable of moving a head such as a laser cutting head 32 in a plane parallel to a work surface, reference may be made to U.S. Pat. No. 3,529,084 to Rich, issued Sept. 15, 1970, assigned to the assignee of the present invention and hereby incorporated by reference as part of the present disclosure.

The bed 16 comprises a series of flexible strip bands 50, 50 which are situated parallel to one another on edge with their top edges lying in a common plane to form an even worksheet supporting surface. The bands 50, 50 are attached between opposing, trough-shaped end frame portions 51 and 53 of the bed 16 and define elongated slots 59, 59 which pass entirely through the bed 16. As shown more clearly in FIGS. 3 and 4, each of the bands 50 comprises a ribbon which circumscribes and is braced and tensioned between a pair of vertical pegs 52 and 55 within the end frame portions 51 and 53, respectively. The peg 52 is slidably received within vertical bores 57 and 95 in a roof and floor of the end frame portion 51 and fits snugly therein and the peg 55 is horizontally, slidably received between a roof and a floor of the end frame portion 53. A tensioning screw 54 passes through a horizontal bore 58 in a end wall of the end frame portion 53 and through apertures 60 and 61 in end portions 65 and 67, respectively of the band 50 and is threadably received by the peg 55 to fix the peg in place and establish the proper tension in the band 50. The end portions 65 and 67 of the band 50 may be cemented or welded together and cemented to the peg 55 or attached to one another and to the peg 55 solely by the screw 54. Because of the fixed attachment of the end portion 65 to the end portion 67, the band 50 is essentially endless.

Figure 3:
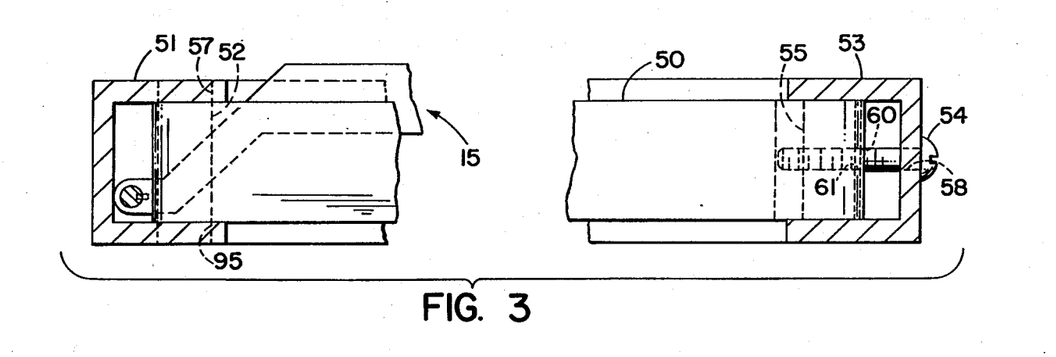
FIG. 3 is enlarged, fragmentary, side plan view of a worksheet supporting bed of the laser cutting system of FIG. 1.
Figure 4:
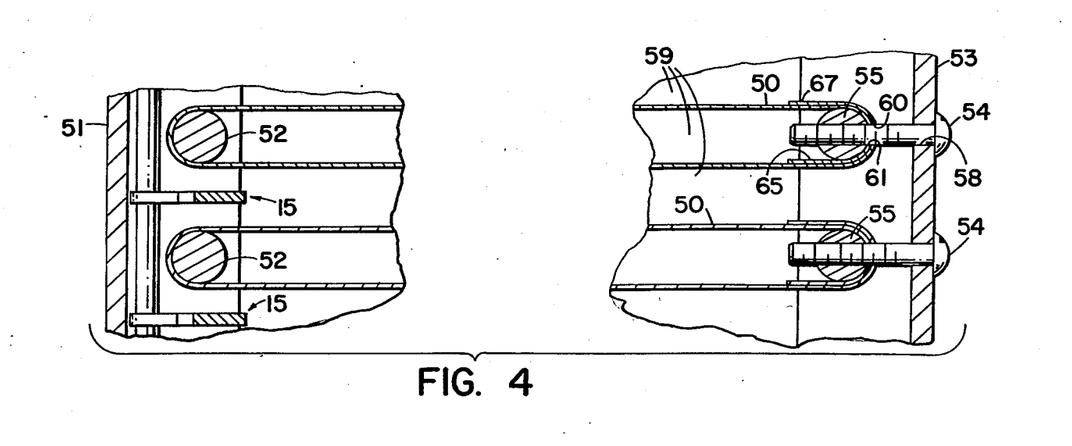
FIG. 4 is a top view of FIG. 3.

The band 50 is typically made of a flexible metal such as aluminum or steel which may stretch and sag over time, in which case, an operator may tighten the tensioning screw 54 to straighten the band. The band may be darkened or roughened on its faces to absorb laser light and has smooth upper edges.

By way of example, the bands 50,50 are one inch high and less than 0.005 inches thick, preferably 0.003 inches thick, and the diameter of the peg 52 as well as that of the peg 55 is ¼ inch and the spacing between centers of the pegs is ½ inch so that the spacing between parallel portions of one band and between adjacent band portions of adjacent bands 50, 50 is ¼ inch. The bands 50,50 are made thin to present a minimum profile or projected area to the laser beam and thereby prevent their upward edges from reflecting laser light incident thereon; at thicknesses greater than 0.005 inches the reflections become significant. Such reflected laser light, if allowed, may burn or mark a cloth or other type of worksheet 41 at places other than the desired lines of cut. The thinness of the bands is limited by the requirements of strength and manufacture tolerance but presumably, as material and manufacturing sciences advance, the bands will be made even thinner.

Due to the absorption of laser light, the bands 50,50 heat to some degree, and due to the normal laser cutting of the worksheet 41, gaseous and particulate byproducts result. To cool the bands, remove the byproducts, and hold the worksheet 41 onto the bed 16 during cutting, a partial vacuum is applied to the underside of the worksheet supporting bed 16 by means of a fan 62 coupled to a vacuum chamber 71 located beneath the bed (shown in FIG. 1). The vacuum acts directly on the worksheet 41 through the slots 59,59 to draw out the gaseous and particulate byproducts and draw in fresh air. As indicated by arrows 78,78, if the worksheet is air-permeable, air is drawn through the worksheet and the slots 59,59 adjacent to the sides of the bands 50,50. This air also cools the bands 50,50. If the worksheet 41 is air impermeable, air is drawn around the sides of the worksheet and the cuts to draw out the byproducts and cool the bands 50, 50 to some degree.

For a further description of the worksheet supporting bed 16, reference may be made to U.S. patent application entitled WORKSHEET SUPPORTING BED FOR LASER CUTTER by David R. Pearl filed concurrently herewith, and assigned to the assignee of the present invention and hereby incorporated by reference as part of the present disclosure.

As shown in FIG. 1, the storage mechanism 18 includes two support brackets 81, 81 which extend from opposite sides of the frame 29, a shaft 82 rotatably mounted between the brackets 81,81, a pulley 83 fixedly attached to the shaft 82, a timing pulley 85, a timing belt 84 trained between the two pulleys and a stepping motor 86 which directly drives the pulley 85 and is under the control of the computer 49. The roll 17 of sheet material snugly receives the shaft 82 so that when the shaft 82 rotates so does the roll 17. The storage mechanism further includes a photoelectric eye comprising a light source 96 and a photosensor 98. The photoelectric eye is continuously operated and has a line of sight 100 which is blocked when the slack loop 20 is sufficiently endowed (as is the case in FIG. 1) and is unimpeded when the slack loop is not sufficiently endowed, in which case the computer activates the motor 86 to turn the roll 17 and thereby draw additional sheet material from it and expand the slack loop 20.

Figure 5:
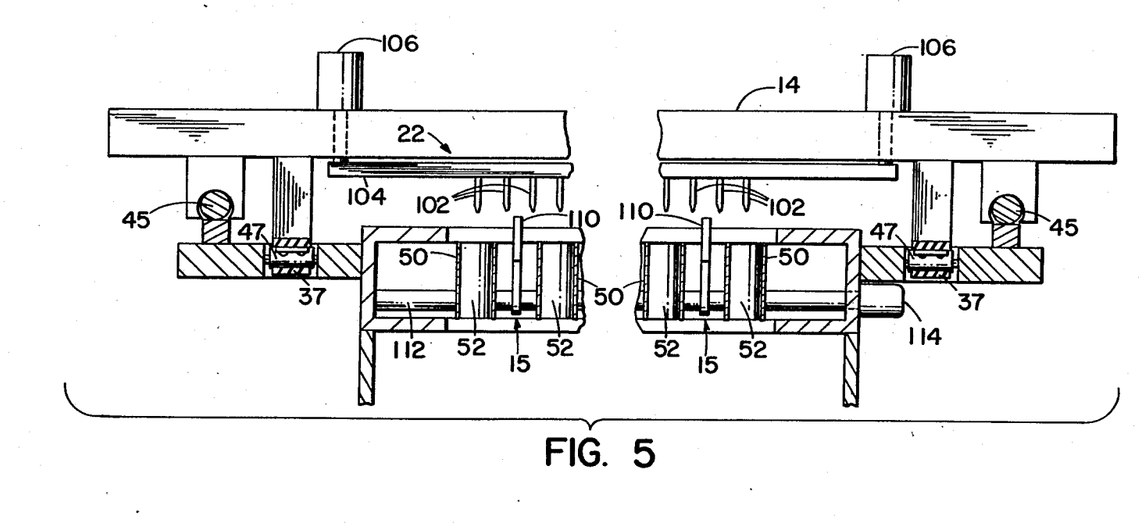
FIG. 5 is an enlarged, fragmentary view of a worksheet transporting mechanism viewed along the line 3—3 of FIG. 2.

As shown in FIG. 5, the transport mechanism 22 comprises a row of pins 102, 102 which pins extend perpendicular to the support bed 16 and are aligned with the slots 59,59, a bar 104 which supports the pins, and two piston and cylinder assemblies 106,106 which support the bar 104 and the pins 102,102. The bar 104 is carried by the gantry 14 and, as discussed in more detail below, the gantry 14 co-operates with the transport mechanism 22 to form a transport assembly 107 which is used to advance the sheet material from the roll 17. The piston and cylinder assemblies are controlled by the computer acting through a solenoid and valve assembly (not shown). When activated, the piston and cylinder assemblies lower the bar 104 and the pins 102,102 so that the pins engage and in some cases pierce the sheet material. The pins may or may not extend into the slots 59,59 of the bed 16 to interdigitate with the bands 50,50. The amount of extension required depends in part on the type of sheet material or workpiece which is being fed and how much the pins need to be extended to reliably engage the sheet material. For example, if the sheet material is thick or firm or stacked as a layup, then it is likely that the pins need not actually pierce the sheet material and need not extend into the slots 59,59; contact with the top surface of the sheet material may be adequate. The penetration by the pins into the slots ensures that the pins maintain engagement with the sheet material when it is pulled onto the bed 16 as discussed below. If desired, the pins 102, 102 can be lowered to a lesser degree or made dull so that they contact the sheet material but do not pierce it. In which case, the slots allow the pins to extend, if desired, beneath the support plane of the bed 16 depressing the sheet material and thereby reliably engage the sheet material.

Figure 6:
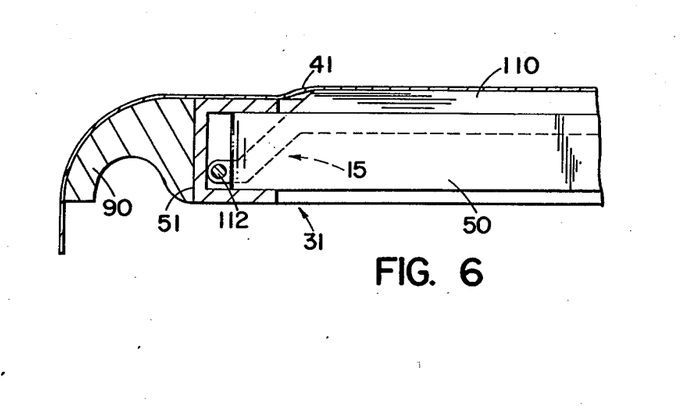
FIG. 6 is an enlarged, fragmentary side view of a worksheet supporting table of the laser cutting system of FIG. 1, and specifically shows a drag bar assembly in its elevated or active position.

As shown in FIG. 6, the drag bar assembly 15 comprises drag bars or strips 110, 110 (see also FIG. 2) fixedly mounted to a common shaft 112 orthogonal thereto, which shaft is mounted to the top of the table 31 for rotation about a horizontal axis and is directly driven by a stepping motor 114. The stepping motor 114 is also controlled by the computer 49. The upper surfaces of the drag bars are roughened to provide frictional engagement with the worksheet 41 and the drag bar assembly 15 may be rotated upwardly to its sheet engaging position while sheet material is pulled onto the support bed 16 to maintain tension in the worksheet and minimize wrinkling.

When the roll 17 is used up and the last bite of sheet material is engaged by the pins 102,102, the other end of the sheet material is free. The drag bar assembly 15 is rotated upwardly to engage the sheet material and prevent it from sliding down the surface of the bed 16 by gravity.

To set up the apparatus 10 for subsequent automatic operation, sheet material is initially pulled manually from the roll 17 and threaded between the roll and a frictionless chute 90 located at the top of the table 31. The sheet material is then pulled along the chute 90 and onto the top portion of the bed 16. Next, the fan 62 is turned on causing a vacuum beneath the bed, which vacuum lightly holds the sheet material against the top surface of the bed and prevents it from falling back towards the slack loop 20 under the weight of the sheet material leading from the slack loop to the guide chute 90. Then (or previously) an operator enters data into the computer 49 via a keyboard 115 to define the shapes of desired pattern pieces and to instruct the computer 49 to begin the automatic feeding and cutting of the sheet material and subsequent removal of the cut pattern pieces.

In response, the computer directs the stepping motor 46 to move the gantry 14 up the inclined support bed 16 to the top so that the transport mechanism 22 is located above the free end of the sheet material. Then, the computer activates the piston and cylinder assemblies 106, 106 to lower the pins 102, 102 into engagement with the sheet material. Depending on the type of sheet material which is fed, the computer may activate the stepping motor 114 to pivot the drag bars 110, 110 upwardly to the position illustrated if FIG. 6 where they protrude slightly above the upper surface of the bed 16 and lightly touch the sheet material from its underside. Then, the computer shuts off the fan 62 and directs the X-motor 46 to move the gantry 14 downwardly along the inclined supported bed 16 pulling the sheet material behind it, the sheet material sliding on the bands 50,50. The drag bars, if necessary, and the weight of the sheet material leading from the slack loop 20 to the guide 90 maintain a slight tension in the sheet material to minimize wrinkling and other unevenness, and as the worksheet is pulled, the motor 86 maintains the slack loop. The slack loop allows the worksheet to be drawn without overcoming the inertia of the roll 17 and resistance associated with rotation of the roll and hence, avoids ribbing of the sheet material which might otherwise occur.

After the gantry 14 has advanced to the lower end of the bed 16 and thereby, advanced the sheet material one "bite" and spread it evenly over the entire surface of the bed, the computer turns on the fan 62 again to cause the worksheet to be held lightly against the upper surface of the bands 50, 50. Then, the drag bars 110, 110 are rotated downwardly by the motor 114 out of engagement with the sheet material and out of the way of the impending laser beam, and the piston and cylinder assemblies 106, 106 are deactivated so that the pins are drawn upwardly out of engagement with the sheet material; the vacuum also facilitates the separation of the pins from the sheet material.

Next, the computer directs the X and Y motors and activates the source 26 of laser beams to cut the desired pattern pieces. After they are cut, the computer directs the gantry to move to the top of the bed until the row of pins 102, 102 of the transport mechanism is located over the end portion of the unused sheet material and activates the piston and cylinder assemblies 106, 106 to lower the pins 110, 110 into engagement with the sheet material. Next, the computer shuts off the fan 62 to cause most, if not all, of the cut pattern pieces and loose scrap to slide by gravity down the inclined bed 16, the smooth upper edges of the bands 50,50 facilitating the sliding. From the bed 16, the pieces and loose scrap slide onto a frictionless chute 111 at the foot of the inclined bed and from there onto the after conveyor belt 24, which transports the cut pattern pieces to another site. It is possible to reversibly drive the fan 62 in the system 10 after the associated sheet material is cut into pieces to develop a cushion of air between the cut pieces and scrap and the bed 16 and thereby facilitate the gravitational removal of the cut pieces and scrap.

FIG. 1 also shows an optional vibrator 141 which is attached to the bed 16 and is under the control of the computer. If desired, after a bite of sheet material is cut into pattern pieces and scrap, the vibrator 141 may be activated to aid the gravity removal of the pattern pieces, the vibrator 141 helping to free the pattern pieces from the bed 16 and minimize friction.

Next, the process described above for spreading a fresh worksheet on the bed 16 is repeated, and it should be noted, that if any of the cut pattern pieces or scrap remain on the bed after the vacuum is shut off, they will be pushed down the inclined bed and onto the chute 111 (FIG. 1) by the attached unused sheet material, by the downward face of the gantry, or by the pins as the gantry pulls the unused sheet material downwardly.

To conserve sheet material, some pattern pieces may extend from one bite of sheet material to the next or over several bites, and in these cases, only a portion of each such pattern piece may be cut from one bite. Consequently, it is important that the computer know the location of the demarcation between adjacent bites so that the computer can direct the laser cutter to resume cutting a portion of such pattern piece from a new bite of sheet material where it left off from the previous bite. Because the gantry 14 pulls the sheet material along the bed 16, the computer can easily measure the length of the bite that is fed by the distance that the gantry moves while engaging the sheet material. The computer then calculates the location of the demarcation to be the position of the upper end of the previous bite displaced forwardly by the length of the succeeding bite.

If desired, after a bite of sheet material has been cut by the laser cutter into pattern pieces and scrap, the laser cutter can be used to sever any of the scrap "matrix" which remains attached to the unused sheet material to facilitate the removal of the pattern pieces and other scrap from the bed 16.

The apparatus 10 as illustrated in FIGS. 1 and 2 also includes an optional storage mechanism 150 which stores a roll 151 of pre-annotated paper 152 used to identify pattern pieces subsequently cut from the sheet material. The storage mechanism 150 includes two end brackets 153, 153 mounted to the frame 29 and extended vertically upwardly and a shaft 154 rotatably supported by ball bearings (not shown) to the end brackets 153, 153. The roll 151 of the pre-annotated paper snugly receive the shaft 154 and rotates freely within the brackets 153, 153.

To set up the sheet material and the roll 151 for subsequent automatic feeding, the sheet material is first pulled from the roll 17 onto the upper end of the bed 16 and then the paper 152 is pulled from the roll 151 over the sheet material. The paper 152 includes hash marks which are spaced by an amount equal to the bite length of the transport mechanism 22, and serve as reference marks for the annotations. When the paper 152 is pulled over the sheet material, the hash mark nearest the end of the paper 152 is aligned with the end of the sheet material.

Then, the fan 62 is turned on to develop the partial vacuum which holds the sheet material onto the bed 16 and the paper 152 onto the exposed surface of the sheet material assuming that the sheet material is air-permeable. If it is not, then the paper 152 simply rests on the sheet material. Next, the computer directs the X-motor to position the pins 102, 102 over the free end of the sheet material and directs the piston and cylinder assemblies 106, 106 to lower the pins into engagement with the paper 152 and the sheet material, the pins passing through the paper 152 and the sheet material and somewhat into the slots 59, 59. Then, the fan 62 is shut off and the computer directs the X-motor to move the gantry downwardly, pulling the paper 152 and the sheet material behind it. Next, the computer activates the source 26 of laser beams and directs the X- and Y-motors to accomplish the cutting of the sheet material and the paper 152. Because the hask mark of the paper is aligned with the sheet material and the computer is familiar with the positioning of the leading edge of the annotations on the paper 152 relative to the hash mark, the computer is able to register such cuts with the annotations. If desired, the gantry 14 can also be outfitted with a mechanism which attaches each annotated portion of the paper 152 to a respective pattern piece of the sheet material because, otherwise the two may be separated during the removal of the cloth piece and paper piece from the bed 16.

Figure 7:
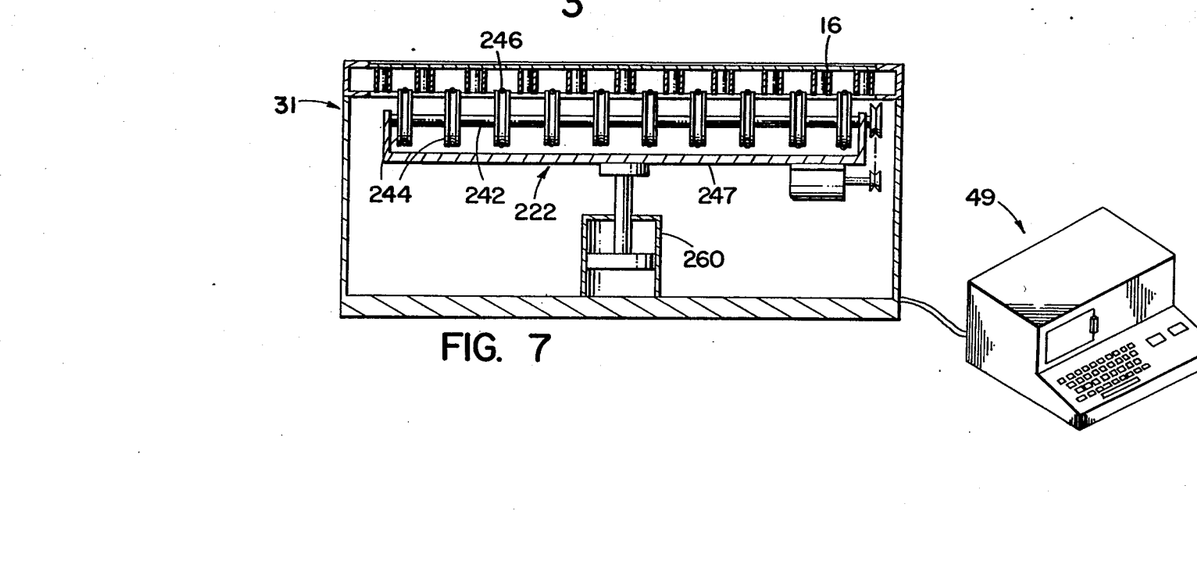
FIG. 7 is an end, sectional view of another laser cutting system in which the invention is embodied.
Figure 8:
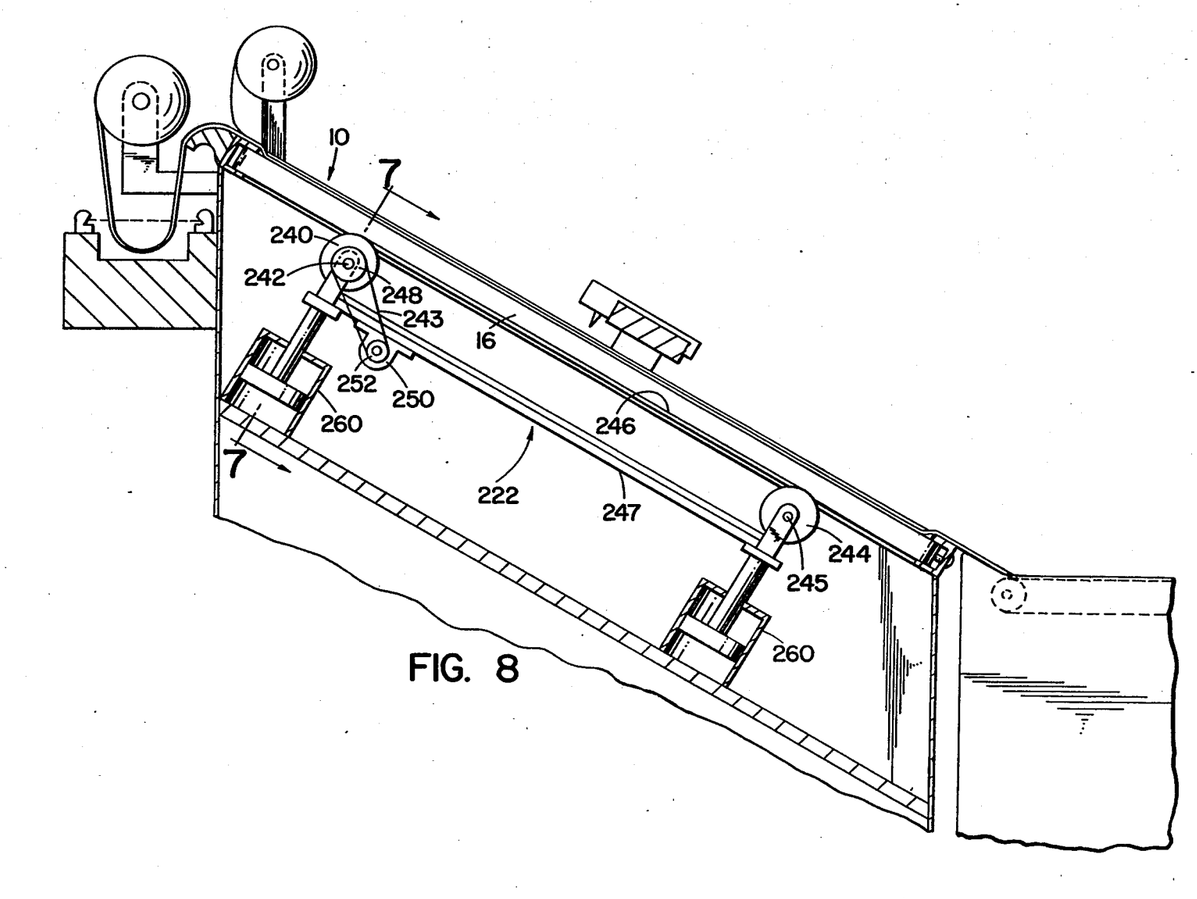
FIG. 8 is a side view of FIG. 7.

FIGS. 7 and 8 illustrate a transport or removal mechanism 222 which may be installed in the laser cutter system 10 to aid in carrying away cut pattern pieces and scrap.

The mechanism 222 comprises transport pulleys 240, 240 fixedly mounted to a common shaft 242, transport pulleys 244, 244 fixedly mounted to a common shaft 245, endless wire conveyor belts 246, 246 trained between pairs of the pulleys 242, 242 and 244, 244, and a bracket 247 for rotatably supporting the common shafts 242 and 245. The wire belts 246, 246 are thin, for example, less than ¼ inch, have a frictional outer surface and are vertically aligned with the slots in the bed 16. The bracket 247 is supported by two piston and cylinder assemblies 260, 260 such that the conveyor belts 246, 246 are parallel to the bed 16, which piston and cylinder assemblies are biased downwardly and are controlled by a computer 249 via a solenoid and valve assembly (not shown). The transport or removal mechanism 222 further comprises a drive pulley 248 fixedly attached to the shaft 242 at one end, a DC motor 250, and a motor pulley 252, and a belt 243 trained between the pulleys 248 and 252, which motor drives the conveyor belts 246, 246 in unison.

After a worksheet is cut into pattern pieces, the gantry 14 is moved to the top of the bed to engage a new bite of sheet material at which position the gantry is also out of the way of the removal mechanism 222. Then, the piston and cylinder assemblies 260, 260 are activated and thereby raised the mechanism 222 upwardly to engage and lift the cut pieces and the scrap. Simultaneously, the motor 250 is activated to carry the cut pieces and scrap onto the chute 111. From there, the cut pieces and scrap proceed to the after conveyor belt. The use of the removal mechanism 222 ensures that the cut pattern pieces and loose scrap will be removed after each bite of sheet material is cut. Note that much or all of the pattern pieces and loose scrap may simply slide by gravity down the bed 16 without the help of the removal mechanism 222 after they are cut.

Figure 9:
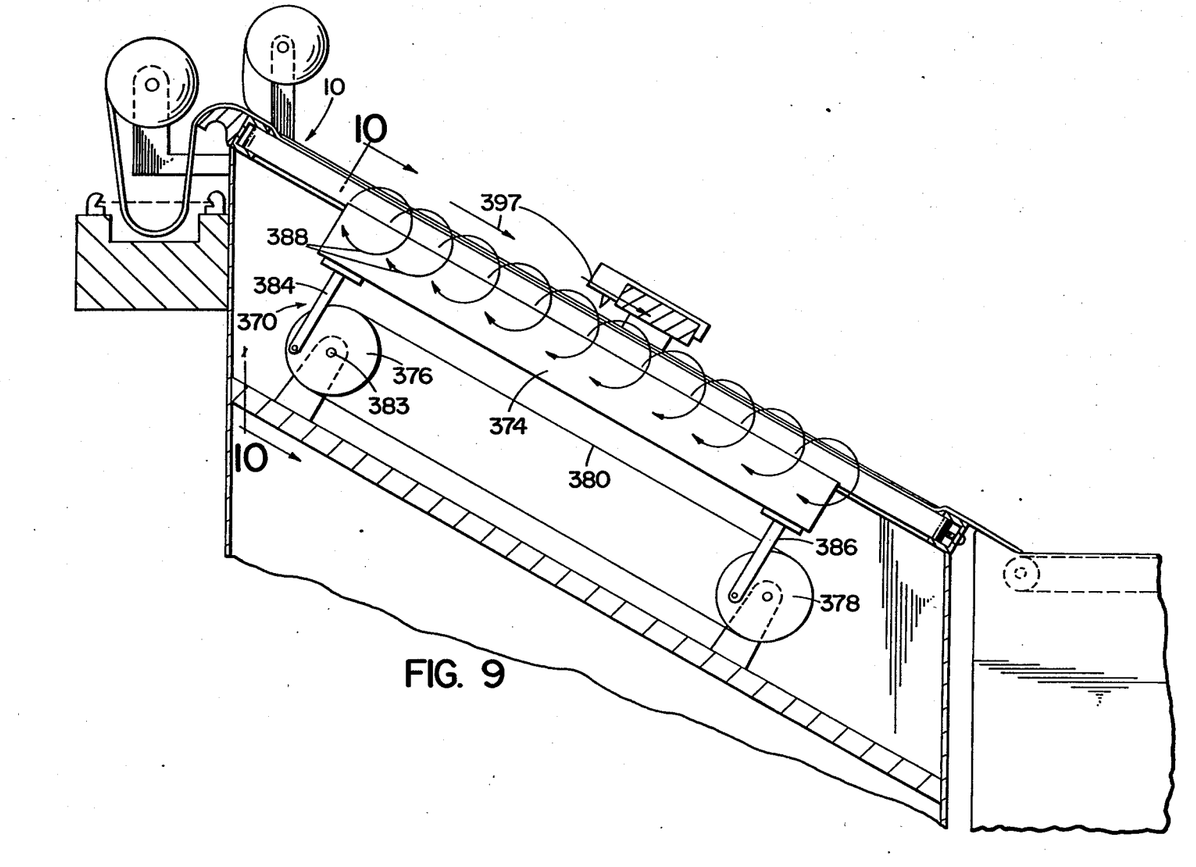
FIG. 9 is a side, schematic view of another laser cutting system in which the invention is embodied.
Figure 10:
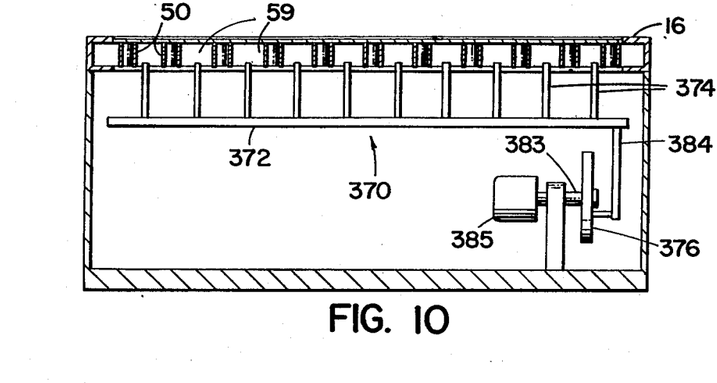
FIG. 10 is an end, sectional view of FIG. 9 taken along the line 10—10.

FIGS. 9 and 10 illustrate a transport or removal mechanism 370 which is installed in the system 10 to ensure removal of cut pieces and scrap. The transport or removal mechanism 370 includes a base plate 372 and fins or rigid strips 374, 374 mounted thereon, parallel to one another, vertically aligned with slots 59, 59 of the bed and edges up with the top edges lying in a common plane. The top edges of the fins 374, 374 are supported parallel to the bed 16. The transport mechanism 370 further includes a wheel 376 mounted on a motor shaft 383 with its axis horizontal and transverse of the slots 59, 59 in the bed, a motor 385 which directly drives the wheel 376, another wheel 378 mounted with its axis parallel to the axis of the wheel 376, a belt 380 which couples the wheel 376 to the wheel 378, and support brackets 384 and 386 pivotally mounted to faces of the wheels 376 and 378, respectively and fixedly mounted to the base plate 372. After a bite of sheet material is cut into pattern pieces and scrap, the gantry 14 is moved to the top of the bed in position to engage the uncut sheet material and to be out of the way of the removal mechanism 370. Then, the wheels 376 and 378 are turned, and the base plate 372 and fins 374, 374 moved in an elliptical orbit as indicated by curved arrows 388,388. In so moving, the top edges of the fins interdigitate with the strip bands 50,50 of the bed, penetrate the slots 59,59 and pass through the support plane defined by the upper edges of the bands. Consequently, the fins lift and move cut pieces and scrap longitudinally of the bed, in the direction indicated by arrows 397,397 (to the right in FIG. 9) and onto the chute 111.

Figure 11:
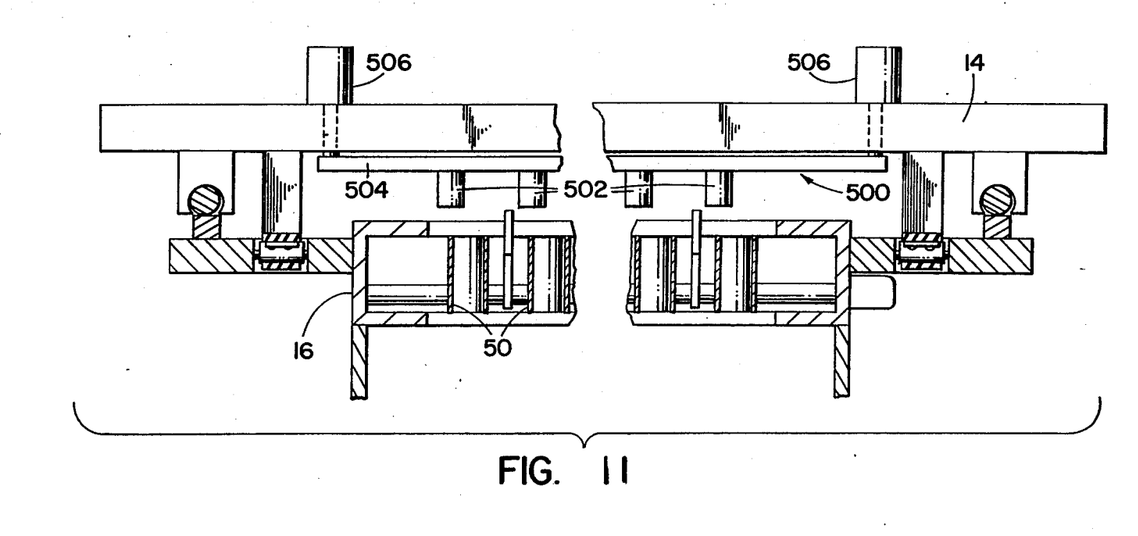
FIG. 11 is an enlarged, fragmentary view of a worksheet transporting mechanism which may substitute for the worksheet transporting mechanism of FIG. 5.

FIG. 11 illustrates a transport mechanism 500 which may be substituted for the transport mechanism 22 in the system 10. The transport mechanism 500 is carried by the gantry 14 and comprises a row of pads 502,502, which pads have a roughened, frictional undersurface, are elongated, and extend perpendicularly to the support bed 16 and are aligned with the bands 50,50. The mechanism 500 also comprises a bar 504 which supports the pads 502,502, and two piston and cylinder assemblies 506,506, which support the bar 504 in a generally horizontal position. The piston and cylinder assemblies 506,506 are biased upwardly and are controlled by the computer acting through a solenoid and valve assembly (not shown).

To feed a fresh bite of sheet material to a cutting position on the bed 16 and to push previously cut pieces and loose scrap down the bed, the gantry 14 is moved to the top of the bed and the piston and cylinder assemblies 506,506 are activated with a light force. Consequently, the pads 502,502 contact the sheet material, capturing it against the upper edges of the bands 50, 50. Then the gantry is moved down the bed and the frictional contact between the roughened under surface of the pads 502,502 and the sheet material coupled with the substantially frictionless interface between the sheet material and the upper edges of the bands 50,50 results in the sheet material being dragged down the bed into the cutting position. The downward force of the piston and cylinder assemblies acting on the pads 502,502 and in turn on the sheet material should be enough to allow adequate frictional engagement between the pads 502,502 and the sheet material but should not be so large as to cause the upper edges of the bands 50,50 to damage the sheet material.

Figure 12:
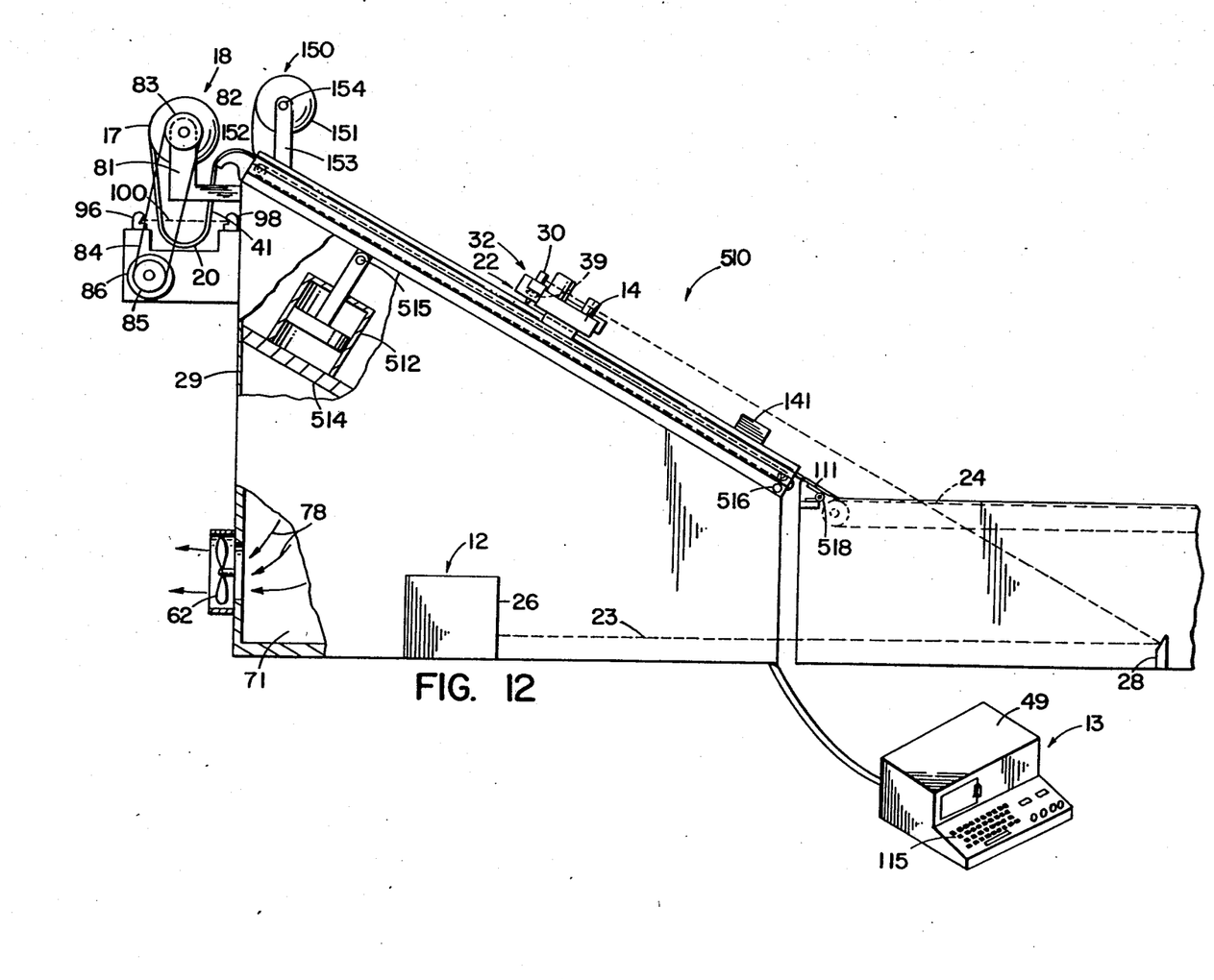
FIG. 12 is a side sectional view of another laser cutting system in which the invention is embodied.

FIG. 12 illustrates another laser cutting system generally designated 510 in which the invention is embodied. The system 510 is identical to the system 10 except as noted below and includes identically referenced components where appropriate. The system 510 includes two piston and cylinder assemblies 512, 512, one supporting each side of the bed 16, which assemblies are attached to a shelf 514 and support the bed 16 at its upper end via flexible connectors 515,515. The piston and cylinder assemblies 512,512 are biased downwardly and are controlled by the computer 49 acting through solenoid and valve assemblies (not shown). The bed 16 is supported to the frame 29 at the bed's lower end by a pin 516 about which the bed can pivot. The chute 111 is also supported at the chute's lower end by a hinge 518 to allow it to pivot in response to the pivotal movement of the bed 16. The upper end of the chute 111 simply rests on the lower end of the bed 16.

After a bite of sheet material is cut into pattern pieces, the gantry 14 is moved up the bed, and the piston and cylinder asesmblies 512,512 are activated to lift the top of the bed upwardly and therefore aid in causing the cut pattern pieces and loose scrap to slide by gravity down the bed, onto the chute 111 and from there onto the after conveyor belt 24. If desired, the vibrator 141 may be activated while the bed 16 is maintained in its elevated position to further aid in the removal of the cut pieces and scrap.

By the foregoing, laser cutting systems in which the invention is embodied have been disclosed. However, numerous modifications and substitutions may be made without deviating from the scope of the invention. For example, clamps may be mounted to the bar 104 instead of the pins 102,102 and used to hold the sheet materials while the gantry is moved down the bed to feed a fresh bite. Also, various combinations of the removal mechanisms 222 and 370, the reversibly driven fan 62, the vibrator 141 and the piston and cylinder assemblies 512,512 may be installed in the system 10 to further aid the removal of cut pieces and scrap. Also, if desired, the systems 10 and 510 may be operated with a feeding mechanism which feeds sheet material directly to the bed and the associated transport mechanism without first delivering the sheet material into a slack loop. Therefore, the invention has been disclosed by way of illustration and not limitation.

We claim:

1. A laser cutting system for cutting sheet material with a laser beam, said system comprising:
    bed means for supporting said sheet material, said bed means comprising a plurality of bands extending in a longitudinal direction of said bed means and supported in tension generally parallel to one another and perpendicular to a common plane with one edge of each band in the common plane to define a support surface for the sheet material during a cutting operation and a plurality of elongated slots defined between the bands, and
    transport means for sliding sheet material over said bands and the support surface longitudinally of said bed means.

2. A laser cutting system as set forth in claim 1 wherein said transport means comprises
    means for engaging sheet material supported on said bed, and including a plurality of mechanical members, each member being positioned relative to at least one of the bands,
    means for moving the engaging means and said bed means relative to one another longitudinally of said slots to effect relative movement of said sheet material and the mechanical members with respect to the bands of said bed means.

3. A laser cutting system as set forth in claim 2 wherein the mechanical members of said engaging means comprises means for frictionally engaging said sheet material.

4. A laser cutting system as set forth in claim 2 wherein each mechanical member of said engaging means comprise a pin-like member which engages said sheet material.

5. A laser cutting system as set forth in claim 4 wherein each pin-like member is aligned with one of said slots between the bands.

6. A laser cutting system as set forth in claim 5 wherein said engaging means includes means for moving said pin-like members at least partially into the slots with which they are aligned.

7. A laser cutting system as set forth in claim 1 further comprising
means for supporting said bed means on an incline relative to a horizontal plane.

8. A laser cutting system as set forth in claim 7 further comprising
means for vibrating said bed means to facilitate movement of cut sheet material along said bed means.

9. A laser cutting system as set forth in claim 2 further comprising
a laser cutter for cutting said sheet material and wherein
said means for moving the engaging means also moves said laser cutter.

10. A laser cutting system for cutting sheet material with a laser beam, said system comprising
bed means for supporting said sheet material, said bed means comprising a plurality of bands supported in tension generally parallel to one another with one lateral edge of each band in a common plane to define a support surface for the sheet material and a plurality of elongated slots defined between the bands,
a plurality of strips aligned with said slots between the bands and
means for moving said strips at least partially through said slots across the sheet material supporting surface of said bed, and longitudinally of said slots to move said sheet material over the bed means.

11. A laser cutting system as set forth in claim 10 wherein said means for moving said strips includes means for moving them orbitally.

12. A laser cutting system as set forth in claim 11 wherein said means for moving said strips orbitally comprises
a bracket coupled at one end to said plurality of strips, and
means for moving the other end of said bracket in a circular path.

13. A laser cutting system for cutting sheet material with a laser, said system comprising:
inclined bed means for supporting said sheet material on an incline, said bed means having a non-snagging surface,
transport means for moving uncut sheet material onto -said bed means for cutting, and
means for holding said sheet material on said bed means during cutting, said sheet material sliding down said bed means after being cut.

14. A laser cutting system as set forth in claim 13 wherein said bed means comprises
a plurality of bands supported in tension with their edges exposed and generally in parallel alignment with one-another such that said exposed edges of said strips form a substantially even sheet material supporting surface.

15. A laser cutting system as set forth in claim 13 further comprising means for increasing the degree of inclination of said bed means to facilitate the sliding of said cut sheet material.

16. A laser cutting system as set forth in claim 13 wherein said means for moving said uncut sheet material comprises
means for pulling said uncut sheet material, and
means for exerting a force on said sheet material which opposed said means for pulling said sheet material to maintain tension in said sheet material while it is being pulled.

17. A laser cutting system as set forth in claim 16 wherein
said means for exerting a force on said sheet material which opposes said means for pulling comprises means for creating drag on said sheet material.

18. A laser cutting system as set forth in claim 17 wherein
said bed means defines a plurality of elongated slots and
said means for creating drag comprises a plurality of drag members which are movable through said slots to engage said sheet material while it is being pulled and are movable to a position beneath said bed means during times of cutting.

19. A laser cutting system as set forth in claim 16 wherein said means for pulling said uncut sheet material comprises:
a plurality of pins,
means for moving said pins into engagement with said sheet material, and
means for moving said pins longitudinally of said bed.

20. A laser cutting system as set forth in claim 13 further comprising means for forcing air upwardly through said bed means to facilitate sliding of sheet material along said bed means.

21. A laser cutting system as set forth in claim 18 wherein said transport means comprises
a plurality of pins,
gantry means for supporting said pins in alignment with said slots,
means for moving said pins at least partially into said slots, and
means for moving said gantry in a direction parallel to said slots while said said pins are located at least partially in said slots.

22. A method for cutting sheet material, said method comprising the steps of:
providing an inclined bed,
moving uncut sheet material onto a cutting area of the inclined bed, said bed having a sliding surface and apertures passing therethrough,
developing a vacuum underneath said bed at a time while it supports said uncut sheet material, which vacuum communicates with said surface of said bed via said apertures to create a holding force on said sheet material,
cutting said sheet material with a laser cutter while said vacuum is applied,
removing said vacuum from said bed after said sheet material has been cut into pieces to release the cut sheet material from the bed and thereby allow said cut sheet material to slide down the inclined bed away from said cutting area.

23. A method as set forth in claim 22 further comprising the step of forcing air upwardly through said apertures of said bed after said vacuum is removed to facilitate the sliding of said cut sheet material,
collecting said uncut sheet material in a slack loop prior to the step of moving it onto said cutting area.

24. A method as set forth in claim 22 wherein the step of moving said uncut sheet material is performed by dragging it along said bed.

25. A method as set forth in claim 24 further comprising the step of providing a drag on said sheet material as it is pulled onto said bed to maintain tension in said sheet material.

26. A method as set forth in claim 22 further comprising the step of pushing said cut sheet material down said inclined bed by the force of the uncut sheet material moving behind it on the bed.

27. A method for cutting sheet material as set forth in claim 22 further comprising the step of
vibrating said bed to aid the cut sheet material in sliding down the bed.

28. A method for cutting sheet material as set forth in claim 22 wherein
said apertures take the form of slots which extend longitudinally of said bed and further comprising the step of
moving a plurality of narrow elements at least partially through said slots and also moving said narrow elements longitudinally of said slots to engage and remove said cut sheet material.

29. A method for cutting sheet material as set forth in claim 22 further comprising the step of
moving additional uncut sheet material onto said cutting area of said inclined bed, said additional uncut sheet material previously being continuous with the sheet material which was previously cut on said bed, said additional uncut sheet material pushing said cut sheet material down said bed when said additional sheet material moves onto said bed.

30. A laser cutting system for cutting sheet material with a laser beam, said system comprising
bed means for supporting sheet material, said bed means comprising a plurality of bands supported in tension generally parallel to one another and on edge to project a minimal area to the laser beam and to define a support surface for the sheet material during cutting, and a plurality of elongated slots defined between the bands,
a plurality of endless conveyors each being aligned with a corresponding one of said slots between the bands and being at least as narrow as said corresponding slot, and
means for moving said endless conveyors at least partially through said slots to engage and transport sheet material supported on said bed means.

31. A laser cutting system as set forth in claim 30 wherein said means for moving said endless conveyors at least partially through said slots includes means for moving said endless conveyors at least partially through the support surface defined by said bonds.

32. A laser cutting system as set forth in claim 31 wherein said endless conveyors comprise endless wires.

33. A laser cutting system as set forth in claim 32 wherein
said endless conveyors are supported for synchronous rotation about a common shaft and
said means for moving said endless conveyors comprises a piston and cylinder assembly which supports said common shaft.

34. A laser cutting system for cutting limp sheet material with a laser beam, said system comprising:
bed means for supporting said limp sheet material, said bed means having a plurality of thin, elongated members extending parallel to one another in a longitudinal direction and projecting a minimal cross sectional area to the laser beam, the parallel members defining a plurality of elongated slots therebetween and a support surface for the material, and
transport means for moving said limp sheet material longitudinally of said elongated members and slots, said transport means including engagement means for penetrating at least partially into at least some of said slots to engage said limp sheet material supported on said support surface, and means for moving said engagement means longitudinally of said elongated members and slots while said engagement means penetrates said slots to move said sheet material.

35. A laser cutting system as set forth in claim 1 wherein the thin elongated members of said bed means comprise a plurality of strips supported on edge generally parallel to one another and in alignment with one another such that said strips form the support surface for said limp sheet material, said slots being defined by spaced between said strips.

36. A laser cutting system as set forth in claim 1 wherein a pair of the bands extending in the longitudinal direction are formed by an elongated, closed loop of band material and are placed in tension by mounts supporting the elongated loop at each end.

* * * * *